(12) United States Patent
Brennecke et al.

(10) Patent No.: US 6,579,343 B2
(45) Date of Patent: Jun. 17, 2003

(54) PURIFICATION OF GAS WITH LIQUID IONIC COMPOUNDS

(75) Inventors: Joan F. Brennecke, Granger, IN (US); Edward J. Maginn, Granger, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 0 days.

(21) Appl. No.: 10/113,400

(22) Filed: Apr. 1, 2002

(65) Prior Publication Data

US 2002/0189444 A1 Dec. 19, 2002

Related U.S. Application Data

(60) Provisional application No. 60/280,032, filed on Mar. 30, 2001.

(51) Int. Cl.[7] .................. B01D 53/14; B01D 53/22; B01D 53/26; B01D 53/62
(52) U.S. Cl. .................. 95/51; 95/52; 95/231; 95/236; 95/237
(58) Field of Search .................. 95/44.45, 50–52, 95/54, 230, 231, 236, 237; 96/4.5

(56) References Cited

U.S. PATENT DOCUMENTS

| | | | | |
|---|---|---|---|---|
| 3,371,468 A | * | 3/1968 | Shropshire | 96/5 |
| 3,426,754 A | * | 2/1969 | Bierembaum et al. | 604/307 |
| 3,801,404 A | * | 4/1974 | Druin et al. | 156/229 |
| 3,819,806 A | * | 6/1974 | Ward, III et al. | 423/220 |
| 3,839,516 A | | 10/1974 | Williams et al. | |
| 3,843,761 A | * | 10/1974 | Bierenbaum et al. | 264/154 |
| 3,843,762 A | * | 10/1974 | Sleigh | 264/213 |
| 3,844,735 A | * | 10/1974 | Steigelmann et al. | 95/44 |
| 3,864,418 A | * | 2/1975 | Hughes et al. | 585/818 |
| 3,920,785 A | * | 11/1975 | Druin et al. | 264/154 |
| 4,055,696 A | | 10/1977 | Kamada et al. | |
| 4,255,376 A | * | 3/1981 | Soehngen | 264/145 |
| 4,257,997 A | * | 3/1981 | Soehngen et al. | 264/145 |
| 4,359,510 A | | 11/1982 | Taskier | |
| 4,359,596 A | | 11/1982 | Howard et al. | |
| 4,405,688 A | | 9/1983 | Lowery et al. | |
| 4,438,185 A | | 3/1984 | Taskier | |
| 4,542,010 A | * | 9/1985 | Roman et al. | 423/579 |
| 4,617,029 A | | 10/1986 | Pez et al. | |
| 4,734,112 A | * | 3/1988 | Okita et al. | 96/5 |
| 4,761,164 A | | 8/1988 | Pez et al. | |
| 4,780,114 A | * | 10/1988 | Quinn et al. | 95/44 |
| 4,789,386 A | * | 12/1988 | Vaughn et al. | 95/51 |
| 4,888,032 A | * | 12/1989 | Busch | 95/44 |
| 4,913,818 A | * | 4/1990 | Van Wijk et al. | 96/4 |
| 4,954,145 A | * | 9/1990 | Thakore et al. | 95/44 |
| 4,961,758 A | * | 10/1990 | Dobitz | 95/44 |
| 5,135,547 A | * | 8/1992 | Tsou et al. | 95/44 |
| 5,220,106 A | | 6/1993 | Boate et al. | |
| 5,281,254 A | * | 1/1994 | Birbara et al. | 95/44 |
| 5,445,669 A | * | 8/1995 | Nakabayashi et al. | 96/5 |
| 5,827,602 A | | 10/1998 | Koch et al. | |
| 5,994,602 A | | 11/1999 | Abdul-Sada et al. | |
| 6,048,388 A | | 4/2000 | Schwarz | |
| 6,103,908 A | | 8/2000 | Bahrmann et al. | |
| 6,165,253 A | * | 12/2000 | Sirkar et al. | 96/6 |
| 6,299,669 B1 | | 10/2001 | Koros et al. | |
| 6,339,182 B1 | | 1/2002 | Munson et al. | |

OTHER PUBLICATIONS

Blanchard et al., "High–Pressure Phase Behavior of Ionic Liquid/$CO_2$ Systems," *J. Phys. Chem. B*, vol. 105, pp. 2437–2444, (2001).

Lynnette A. Blanchard, Dan Hancu, Eric J. Beckman and Joan F. Brennecke, "Green Processing Using Ionic Liquids and $CO_2$," *Nature*, 399, p. 28–29, (1999).

Lynnette A. Blanchard and Joan F. Brennecke, "Recovery of Organic Products from Ionic Liquids Using Supercritical Carbon Dioxide," *Ind. Eng. Chem. Res.*, 40(*1*), p. 287–292, (2001).

Tae H. Cho, Joan Fuller and Richard T. Carlin, "Catalytic hydrogenation using supported ionic liquid membranes," *High Temp. Material Processes* 2, 543–558, (1998).

Richard T. Carlin and Joan Fuller, "Ionic liquid–polymer gel catalytic membrane," *Chem. Commun.*, *15*, 1345–1346, (1997).

Guido P. Pez and Richard T. Carlin, "Molten Salt Facilitated Transport Membranes. Part 1. Seperation of Oxygen from Air at High Temperatures," *J. Membrane Science*, 65, 21–30, (1992).

Daniel V. Laciak, Guido P. Pez and Peter M. Burban, "Molten Salt Facilitated Transport Membranes. Part 2. Separation of Ammonia from Nitrogen and Hydrogen at High Temperatures," *J. Membrane Science*, 65, 31–38, (1992).

Marc Doyle, Susan K. Choi, and Grant Proulx, "High–Temperature Proton Conducting Membranes Based on Perfluorinated Ionomer Membrane–Ionic Liquid Composites," *J. Electrochemical Soc.*, *147*, 34–37, (2000).

* cited by examiner

*Primary Examiner*—Robert H. Spitzer
(74) *Attorney, Agent, or Firm*—Barnes & Thornburg (57) ABSTRACT

The present invention provides a method for purifying a gas by contacting the gas with a liquid ionic compound. Natural gas may be purified, removing water and carbon dioxide, by contacting the natural gas with a liquid ionic compound.

30 Claims, 6 Drawing Sheets

PURIFICATION OF GAS WITH LIQUID IONIC COMPOUNDS

CROSS REFERENCE TO RELATED APPLICATIONS

This application claims priority to provisional patent application Serial No. 60/280,032 filed Mar. 30, 2001, the disclosure of which is incorporated herein by reference.

This invention was made with Government support under Grant CTS 99-87627 and Grant R 826734-01-0 awarded by the National Science Foundation and the Environmental Protection Agency, respectively. The Government has certain rights in the invention.

FIELD OF THE INVENTION

This invention pertains to the purification or separation of gases using liquid ionic compounds.

BACKGROUND AND SUMMARY OF THE INVENTION

Purified gases are necessary for many industrial processes. For example, air must be purified by removing water vapor to produce dried air for use in machinery such as spray painting equipment, dental compressors, coordinate measuring machines, process controls, HVAC systems, pneumatic controls, electronics, and the like. Furthermore, dried air is required for the preparation of dry nitrogen. Purified nitrogen, free of both water and oxygen, is used in the storage and shipping of both flowers and food, as well as in delicate scientific operations, such as gas chromatography and mass spectroscopy. Other important industrial gases that are used in purified form include helium, argon, hydrogen, oxygen, and hydrocarbons. Typically, the gas purification processes involve the removal of water, carbon dioxide, or other component gases which may interfere with the end-use dependent application of the purified gas.

The natural gas commonly used in nearly every household originates in underground sedimentary rock formations. Natural gas may contain a variety of impurities including carbon dioxide ($CO_2$) and water. It is desirable to remove these two impurities for several reasons. Water may form hydrocarbon hydrates, possibly forming solids, that can plug pipelines and pumping equipment. These hydrates are an exceptional concern in cold climates or in high-pressure systems where solid formation may be more likely. In addition, the presence of $CO_2$ tends to decrease the heating value of natural gas. Finally, the combination of $CO_2$ and water impurities in natural gas may form carbonic acid which is corrosive to pumping equipment and the pipeline used for transporting the natural gas to storage facilities or end-users. Economic benefit is realized by removing these impurities, and by doing so as close to the well-head as possible.

Current methods of gas purification include the use of serial gas/liquid absorbers or gas/solid adsorbers. Gas/liquid absorbers may include pure liquids or liquid solutions that preferentially partition components of the gas. Gas/solid adsorbers may include substances, such as sodium bicarbonate, and the like, that preferentially remove certain compounds based upon affinity, or molecular sieves that differentiate the various gas components on the basis of molecular size or other physical property. The liquid or solid material employed in these separators is known as a mass separating agent (MSA) and advantageously exhibits a differential affinity for one or more of the gas components. MSAs may also be chosen, for example based on their stability to extreme environments, such as extremes in temperature or pressure, stability to certain organic solvents, and stability to pH extremes. Furthermore, MSAs may be added directly to a process stream to enable separation.

Other separation schemes may also be employed, such as the use of inorganic membranes, polymeric membranes, supported liquid membranes, and the like. Gases may also be separated in cryogenic processes.

Serial gas/liquid and gas/solid separators may be configured in linear arrays of absorption and adsorption units. These arrays are designed to remove a plurality of gaseous impurities by contacting a gas stream with several liquid or solid MSAs, each designed to remove preferentially at least a portion of these gaseous impurities, thereby producing an effluent gas stream enriched in the remaining gaseous components. In such processes, the liquid or solid MSA becomes loaded with the gaseous impurity. In an alternative arrangement, the liquid or solid MSA may preferentially take up the desired gas component for recovery later, thus producing an effluent gaseous stream of impurities. The desired component may be released from the MSA in another step of the process. It is appreciated that the process design selected for removal of impurities or the alternative collection of a desired component in a given gas purification procedure will depend upon several factors, including the selectivity exhibited by the MSA for particular gas components, the ease with which the desired component may be recovered from the MSA, and others.

In systems where impurities are removed by selective absorption, it is often the case that multiple absorbers are used, one for each gas component impurity. For example, at present, two absorbers are required to remove $CO_2$ and water from natural gas. Carbon dioxide can be selectively removed with a gas/liquid absorption unit charged with an aqueous amine solution, such as mono- or diethanolamine. These amines form carbamates upon reaction with $CO_2$, and these carbamates preferentially partition into the aqueous liquid stream. Similarly, water may be removed by preferential absorption with a gas/liquid absorption unit charged with an ethylene glycol liquid stream. In addition, water may be preferentially removed with polymeric membrane modules.

As many gas purification processes require the removal of more than one impurity, current conventional gas/liquid absorbers employ a separate absorption unit for removing each impurity. For example, one unit designed to remove carbon dioxide and an additional unit designed to remove water may be used as described above for natural gas. In addition, volatile components present in the absorbers, such as the amines used for $CO_2$ absorption, often evaporate into the gas stream. Thus, the removed $CO_2$ impurity may be replaced by the amine absorbing component. The resulting amine contamination is typically removed via condensation by means of a cold trap, and may be returned to the absorbing unit. However, such removal requires additional components added to the purification system. The requirement for multiple absorption units along with additional purification steps to remove subsequently released MSA can increase process time and operating costs. Furthermore, such complex systems may preclude near well-head implementation in deference to a centralized system for purification, and further increase the overall cost of goods resulting from the increased cost of transporting impure material. Finally, once exhausted, traditional absorbers must be replaced and few options are available for recovery or regeneration of spent MSAs, thereby adding replacement and disposal costs.

Liquid ionic compounds (LICs), often called "ionic liquids" are essentially non-volatile, having immeasurably low vapor pressures; they are not volatilized into the purified gas stream. Their low vapor pressure minimizes loss of absorbing material during use and provides a simple mechanism for regeneration, such as by distillation, evacuation, or by extraction with a supercritical fluid, such as supercritical carbon dioxide.

As described herein, in one embodiment, the LIC selectively solubilizes impurities, leaving the desired gas in the gas stream. It is appreciated that in variations of the methods described herein, the LIC may selectively solubilize the desired gas component, leaving the impurities behind in the effluent stream. In such variations, recovery of the desired material may be accomplished by processes analogous to the regeneration mechanisms described above. Distillation, evacuation, or extraction with a supercritical fluid, and the like, will regenerate the LIC and simultaneously recover the desired purified gas; recovery rates greater than 90% are not unexpected.

Moreover, LICs can be tailored for specific needs, allowing a single absorption unit to be used for the removal of more than one impurity, depending on the relative solubilities and/or diffusibilities in the LIC of the desired gas and the impurities.

Furthermore, LICs may be prepared by simple and relatively inexpensive methods. Therefore, purification systems designed around LICs may be more amenable to near-wellhead processes in anticipation of their reduced operating costs. Finally, their exceedingly low vapor pressures make LICs environmentally friendly, during both use and regeneration, since both MSA loss and waste associated with MSAs may be minimized.

Thus, in one embodiment a method is provided for purifying a gaseous mixture by contacting the gaseous mixture with a liquid ionic compound. In an illustrated embodiment, natural gas containing impurities such as water and carbon dioxide may be advantageously processed using LICs to provide purified natural gas for various industrial uses. In an illustrated example, the LICs preferentially absorb those impurities when contacted with the crude gas stream. Similarly, in another illustrated example, in the first step of producing purified nitrogen from air, impurities such as water and carbon dioxide are removed using an LIC. Subsequent separation of the oxygen and nitrogen may be performed by cryogenic distillation. In another example, commercial argon is also produced via the cryogenic distillation of air. In some processes, liquefaction and distillation are used to produce a low-purity crude argon product. Further purification to a higher-purity commercial product by removing oxygen with a LIC is contemplated by the present invention.

It is appreciated that a gas may be contacted with the liquid ionic compound by conventional means known by those of ordinary skill in the art. Once the liquid ionic material contacts the gas, certain components such as carbon dioxide and water are extracted from the gas owing to the solubilities exhibited by various gas components in the LIC. LICs of the present invention include, but are not limited to, quaternary imidazolium salts, and quaternary aromatic 5- and 6-membered-ring heterocycles such as imidazolium salts, pyridinium salts, and the like. Specific examples include, but are not limited to, 1-butyl-3-methylimidazolium hexafluorophosphate, 1-octyl-3-methylimidazolium hexafluorophosphate, 1-butyl-3-methylimidazolium nitrate, 1-octyl-3-methylimidazolium tetrafluoroborate, 1-ethyl-3-methylimidazolium ethylsulfate, and N-butylpyridinium tetrafluoroborate.

DETAILED DESCRIPTION OF THE INVENTION

The present invention pertains to the use of a liquid ionic compound (LIC) to separate certain gas components from a gaseous mixture. The gaseous mixture may be contacted with one or more liquid ionic compounds to separate at least a few of the gaseous components in the gaseous mixture due to the preferential solubility and/or diffusibility of the components in the LICs. Therefore, impurities, such as water, carbon dioxide, oxygen, and the like, may be removed from gases using methods described herein. An illustrative embodiment is a method to purify natural gas by removing impurities, such as carbon dioxide and water, by contacting the natural gas with a LIC. In another illustrative embodiment, low purity argon is purified by separating the oxygen impurity upon contact with a LIC. Other gases which may be purified using the present invention include nitrogen and air.

For the purposes of this disclosure, it is understood that the gas and gaseous mixture may include vapors (volatilized liquids), gaseous compounds, and/or gaseous elements. Furthermore, while reference is made to "purification," it is understood that purification may include purification to be essentially free of one or more impurities, or may include separation to provide enrichment of the desired gas.

The use of LICs in accordance with this invention takes advantage of the differential solubility of various gas components present in source gases. Henry's law (eq. 1) illustratively forms the basis for assessing the capability of separating such components.

$$p_i = K_i(x_i). \qquad (\text{eq. 1})$$

For a gas component (i), the mole fraction (x) of the gas dissolved in the LIC is a function of the partial pressure (p) of the gas, related by Henry's law constant (K). Gases exhibiting lower Ks are more soluble in the LIC than gases with higher Ks. Therefore, the selectivity of the LIC for two gases (i) and (j) may be represented by the ratio of their Henry's law constants ($K_i/K_j$). This ratio is predictive of the efficiency of separation of the gas (i) from the gas (j) using a LIC. Therefore, the greater the ratio, the more efficiently gas (j) can be separated from gas (i) by the LIC. At ratios approaching about 20, separations are typically satisfactory for general industrial scale separations. However, some separation processes may require higher exhibited ratios to yield satisfactory levels of purification. On the other hand, it is possible to obtain a satisfactory separation/purification level when the ratio is as low as about 2.0. Certain separation methods, such as batch separation methods, may be effective even with somewhat lower ratios, wherein the ratio of Henry's law constants for the gases to be separated may be as low as about 1.7. Preferably the $K_i/K_j$ ratio for two gases being separated in accordance with this invention is at least about 1.7 to 2.0, more preferably at least 17, and most preferably about 20 or higher for commercially efficient separations.

The term "liquid ionic compound" or "LIC" as used herein refers to a nonpolymeric salt comprising an organic cation and any of a variety of anions that is reasonably fluid under ambient conditions. The salt may comprise monovalent or polyvalent anions or cations. In addition, the LIC may be a single salt or a mixture of salts. The anions described herein are typically relatively non-nucleophilic anions. The term "ambient conditions" as used herein refers to temperatures from about 1° C. to about 100° C. and pressures of about 1 atmosphere. It is appreciated that some LICs useful in the present invention may have melting points above ambient temperatures. However, all LICs can be distinguished from conventional "molten salts", such as sodium chloride, requiring excessive temperatures (>250° C.) to achieve a liquid phase. The LICs of the present invention have advantageously negligible vapor pressures under ambient conditions and often form stable liquids at temperatures up to about 300° C. LICs also have a wide range of miscibilities with organic solvents and water; however, the LIC is not necessarily soluble in either one or the other of organic solvents or water.

It is appreciated that the anion component of the LIC may impart acidic, basic, or neutral properties to the LIC. Such properties may be conveniently considered when choosing the LIC to enhance the capacity or selectivity of the separation. For example, LICs exhibiting more basic character may be better suited for $CO_2$ absorption rather than for ammonia absorption.

It is also appreciated that "dried" LICs, those that are substantially anhydrous, may exhibit greater overall capacity for removing some gaseous components, the presence of water in the LIC may reduce the capacity of the LIC for dissolving gas components. In addition, the presence of water may decrease the solubility of certain gas components, especially those gas components that are hydrophobic. It is further appreciated that dried LICs may exhibit differential selectivities between various gaseous components when compared to those LICs containing measurable amounts of dissolved water, such as LICs having been exposed to humid atmospheres. LICs may be dried by conventional methods, such as by heat treatment, exposure to a reduced pressure environment, or a combination of heat and reduced pressure.

It is known that gas solubility in various liquids, including LICs, is dependent upon temperature. It is therefore appreciated that different gas components may each elicit a different sensitivity to temperature changes as pertains to the solubility of the gas component in the LIC. This differential temperature dependence may be advantageously exploited by conducting variations of the process of the present invention at different temperatures to optimize gas component separation.

Contacting the LIC with the gaseous mixture may be accomplished in any of the variety of ways. The process is illustratively selected to promote intimate mixing of the liquid ionic compound with the source gas and is conducted for a time sufficient to allow significant removal of targeted components. Thus, systems maximizing surface area contact are desirable. Illustratively, contacting can occur by permeation through a supported liquid membrane or by use of conventional liquid absorbers, such as counter-current liquid absorbers and the like.

Supported liquid membranes comprise a solvent such as a liquid ionic compound contained within the pores of a solid microporous support, such as a ceramic, metal, or polymeric support. Supported liquid membranes fabricated from supports such as ceramics, metals, and certain heat stable polymers may advantageously be used in higher than ambient temperature operations. Such higher temperature operations may be preferred to effect a more rapid separation, requiring less contact time. In addition, these higher temperature operations may also be a consequence of the process configuration, such as configurations requiring purification of high temperature exhaust gases or other gases exiting high temperature operations. Supported liquid membranes suitable for purifying high temperature gases obviate the need to pre-cool such gases before contact with the supported liquid membrane. Microporous supports suitable for use in the present invention and their methods of preparation are well known in the art (see, for example, U.S. Pat. Nos. 3,426,754; 3,801,404; 3,839,516; 3,843,761; 3,843,762; 3,920,785; 4,055,696; 4,255,376; 4,257,997; 4,359,510; 4,405,688 and 4,438,185, the disclosures of which are hereby incorporated by reference). The supported liquid membranes may be fabricated as thin films or hollow fibers with continuous networks of interconnected pores leading from one surface to the other. Supported liquid membranes contact a feed gas mixture on one side of the membrane and may effect separation of a gas component from the mixture by allowing that component to escape via permeation or diffusion into the LIC and through the liquid membrane.

The LIC may also be used in a conventional gas/liquid absorption unit-based system comprising a fixed bed. Such systems can be operated in batch mode or continuous flow mode. In a typical batch mode configuration, the LIC is introduced into a vessel followed by introduction of the gas mixture. After a prescribed residence time, the resulting gas is removed, leaving behind an impurity or group of impurities dissolved in the LIC. The batch purified gas can be generated by heating or reduced pressure treatment as described above. To maximize contact of the LIC and the gas mixture, the LIC can be coated on a solid support, such as glass beads, and the like, to increase the surface area of the LIC capable of contacting the gas mixture.

In another embodiment, the LIC may be contacted with the gas mixture in a flow apparatus. The above batch processes may be adapted for flow where the flow rate through the vessel correlates to the residence time of contact and is suitably chosen to afford an effluent stream with the desired purification tolerance. As the LIC capacity for impurity retention is exhausted and the tolerance is no longer met, the purification unit can be regenerated as described.

To promote the desired intimate mixing discussed above, such gas/liquid absorption units also may be operated in a dual flow mode. Such dual flow can be co-current or counter-current. In such an embodiment, the gas mixture and the LIC flow through a purification unit contemporaneously. In either the co-current or the counter-current aspects, the contacted LIC may be regenerated prior to reintroduction to the purification unit.

LICs for use in the present invention include, but are not limited to, quaternary aromatic 5- and 6-membered-ring aromatic heterocycles, such as imidazolium salts, pyridinium salts, pyrimidinium salts, and the like.

In one embodiment, LICs of Formula I are employed:

Formula I where:

$R^1$ is hydrogen or $C_1$–$C_{18}$ alkyl;

A is —O—, —S—, or —N($R^4$)—;

B is —N— or —C($R^5$)—;

$R^2$, $R^3$, $R^4$, and $R^5$ are independently hydrogen, $C_1$–$C_6$ alkyl, $C_2$–$C_6$ alkenyl, $C_3$–$C_6$ cycloalkyl, $C_3$–$C_8$ cycloalkenyl, aryl, substituted aryl, aryl($C_1$–$C_4$ alkyl), or substituted aryl($C_1$–$C_4$ alkyl); and X is an anion selected from the group consisting of hydroxide, chloride, bromide, iodide, borate, tetrafluoroborate, cuprate, Cu(I)Cl$_2$ anion, phosphate, hexafluorophosphate, hexafluoroantimonate, perchlorate, nitrite, nitrate, sulfate, a carboxylate, a sulfonate, a sulfonimide, and a phosphonate; and, n is an integer from 1 to 4.

In another embodiment LICs of Formula II are employed for gas purification:

Formula II where:

$R^1$ is as defined above;

A is as defined above;

B is as defined above;

$R^2$ is as defined above;

$R^6$ is hydrogen, $C_1$–$C_6$ alkyl, $C_2$–$C_6$ alkenyl, $C_3$–$C_6$ cycloalkyl, $C_3$–$C_8$ cycloalkenyl, aryl, substituted aryl, aryl($C_1$–$C_4$ alkyl), or substituted aryl($C_1$–$C_4$ alkyl);

X is as defined above; and, n is as defined above.

In another embodiment LICs of Formula III are employed for gas purification:

Formula III where:

$R^1$ is as defined above;

U, V, and W are independently —N— or —C($R^9$)—, provided that U and V are not simultaneously —N—;

$R^7$, $R^8$, and $R^9$ are independently hydrogen, $C_1$–$C_6$ alkyl, $C_2$–$C_6$ alkenyl, $C_3$–$C_6$ cycloalkyl, $C_3$–$C_8$ cycloalkenyl, aryl, substituted aryl, aryl($C_1$–$C_4$ alkyl), or substituted aryl($C_1$–$C_4$ alkyl);

X is as defined above; and, n is as defined above.

The term "$C_1$–$C_6$ alkyl" refers to a monovalent linear or branched chain of from one to six carbon atoms, such as methyl, butyl, 2,3-dimethylbutyl, and the like.

Similarly, the term "$C_1$–$C_{18}$ alkyl" refers to a monovalent linear or branched chain of from one to eighteen carbon atoms, such as butyl, octyl, 2-methyldodecyl, and the like.

The term "$C_2$–$C_6$ alkenyl" refers to a monovalent linear or branched chain of from two to six carbon atoms containing one or more double bonds, such as ethenyl, 2-propenyl, 3-methyl-3-butenyl, and the like.

The term "$C_2$–$C_6$ alkynyl" refers to a monovalent linear or branched chain of from two to six carbon atoms containing one or more triple bonds, such as ethynyl, 2-propynyl, 3-methyl-3-butynyl, and the like.

The term "$C_3$–$C_8$ cycloalkyl" refers to a monovalent chain of from three to eight carbon atoms that form a cyclic structure, such as cyclopropyl, cyclohexylmethyl, α-methyl-2-methylcyclopentylmethyl, and the like.

The term "$C_3$–$C_8$ cycloalkenyl" refers to a monovalent chain of from three to eight carbon atoms containing one or more double bonds that form a cyclic structure, such as 2-cyclopropylethenyl, cyclohex-2-enylmethyl, α-methyl-5-methylcyclopent-2-enylmethyl, and the like.

The term "aryl" refers to a cyclic aromatic radical, optionally containing one or more heteroatoms, such as oxygen, nitrogen, and sulfur, such as phenyl, naphthyl, pyridyl, and the like.

The term "substituted aryl" refers to aryl as described herein, where from one to about three hydrogen atoms on the aryl are substituted with monovalent groups, such as halo, alkyl, haloalkyl, alkoxy, haloalkoxy, alkylthio, haloalkylthio, alkylamino, alkanoyl, cyano, nitro, and the like.

The term "halo" refers to one or more halogens as a substituent selected from the group consisting of fluoro, chloro, bromo, and iodo.

The term "alkoxy" refers to a monovalent linear or branched chain of carbon atoms, and oxygen, such as methoxy, butoxy, 2,4-dimethylbutoxy, and the like.

The term "alkylthio" refers to a monovalent linear or branched chain of carbon atoms, and sulfur, such as methylthio, butylthio, 2,4-dimethylbutylthio, and the like.

The term "alkylamino" refers to one or two independently chosen alkyl groups, said alkyl groups each being a monovalent linear or branched chain of carbon atoms, and nitrogen, such as methylamino, dibutylamino, N-(2,4-dimethylbutyl)-N-methylamino, and the like.

The term "alkanoyl" refers to a monovalent linear or branched chain of carbon atoms, and a carbonyl group, such as acetyl, butanoyl, 2,4-dimethylbutanoyl, and the like.

It is appreciated that any combination of the above terms will refer to the corresponding chemical structures. Hence, "haloalkyl" refers to alkyl, as defined above, substituted with halo, as defined above, such as trifluoromethyl, 2,2-difluoro-1-bromoethyl, 3,3,3,2,1,1-heptafluoro-2-trifluoromethylpropyl, and the like.

Carboxylates useful as anions include alkylcarboxylates, such as acetate, substituted alkylcarboxylates, such as lactate, and haloalkylcarboxylates, such as trifluoroacetate, and the like.

Sulfonates useful as anions include alkylsulfonates, such as mesylate, haloalkylsulfonates, such as triflate and nonaflate, and arylsulfonates, such as tosylate and mesitylate, and the like.

Sulfonimides useful as anions may be mono- or disubstituted sulfonimides, such as methanesulfonimide and bis ethanesulfonimide, optionally halogenated sulfonimides, such as bis trifluoromethanesulfonimide, arylsulfonimides, such as bis (4-methoxybenzene)sulfonamide, and the like.

Phosphonates useful as anions include alkylphosphonates, such as tert-butylphosphonate, and arylphosphonates, such as 3,4-dichlorophenylphosphonate, and the like.

In one embodiment, the liquid ionic compound used for gas purification is a compound selected from the group of imidazolium salts, pyrazolium salts, oxazolium salts, thiazolium salts, triazolium salts, pyridinium salts, pyridazinium salts, pyrimidinium salts, and pyrazinium salts. Illustrative of such compounds are 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium tetrafluoroborate, 1-butyl-3-methylimidazolium iodide, 1-butyl-3-methylimidazolium nitrate, 1-ethyl-3-methylimidazolium tetrafluoroborate, 1-ethyl-3-methylimidazolium bromide, 1-ethyl-3-methylimidazolium iodide, 1-ethyl-3-methylimidazolium nitrate, 1-butylpyridinium tetrafluoroborate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium triflate, 1-butyl-3-methylimidazolium acetate, 1-butyl-3-methylimidazolium trifluoroacetate, and 1-butyl-3-methylimidazolium bis(trifluoromethanesulfonimide).

In another embodiment, the liquid ionic compound is used in a conventional gas/liquid absorption unit. The gas/liquid absorption unit may be operated as a batch process or as a flow process. The flow processes may be operated in such a manner that the LIC flows co-currently or counter-currently relative to the flow of the gas stream to be purified or separated.

In another embodiment, the liquid ionic compound is applied to a membrane. The membrane can be a supported liquid membrane for liquid/gas separations. A supported liquid membrane comprises a LIC which is contained within the pores of a solid, microporous structure.

As an illustrated embodiment, the present invention provides a method for purifying a gas by removing carbon dioxide from a gaseous mixture. Carbon dioxide can be removed by contacting a multi-component gas stream containing carbon dioxide with a liquid ionic compound. The present invention also provides a method for removing water from a gaseous mixture by contacting the gaseous mixture with a liquid ionic compound. The present disclosure also provides a method for purifying a gas from a gaseous mixture by contacting the gaseous mixture with a single liquid ionic compound or a mixture of liquid ionic compounds to contemporaneously remove carbon dioxide and water.

The liquid ionic compounds of the present invention can be prepared by any of preparation methods known in the art, such as by halide salt metathesis and acid-base neutralization reactions. Preparations are illustratively described in U.S. Pat. No. 6,048,388, incorporated herein by reference. For example, a 1-alkyl-3-methyl imidazolium halide can be prepared by mixing 1-methylimidazole with an alkylhalide either neat or optionally in a suitable organic solvent, such as acetonitrile or ethyl acetate. Solvents may be advantageously chosen to generate a homogenous mixture of the resulting LIC or a heterogenous mixture consisting primarily of two layers. In the latter, the layers may be separated for easy isolation of the LIC layer from the reaction mixture.

The following examples set forth particular exemplary embodiments of the invention as described above. The examples are not to be construed as limiting the invention to the materials, conditions, or process parameters contained therein.

EXPERIMENTAL EXAMPLES

Materials

The 1-n-butyl-3-methylimidazolium hexafluorophosphate ([bmim][PF$_6$]), was obtained from Sachem and had a residual chloride of 3 ppm. 1-n-octyl-3-methylimidazolium hexafluorophosphate ([C$_8$mim][PF$_6$]) and 1-n-octyl-3-methylimidazolium tetrafluoroborate ([C$_8$mim][BF$_4$]) were prepared by conventional methods. Water was deionized using a Milli-Q water filtration system from Millipore. The carbon dioxide was obtained from Scott Specialty Gases, with a purity of 99.99%. The methane and ethane were both obtained from Matheson Gas Products, with purities of 99.97% and 99.99%, respectively. The remaining gases were all purchased from Mittler Supply Company with the following purity: the ethylene had a purity of 99.5%, the hydrogen had a purity of 99.999%, carbon monoxide had a purity of 99.97%, the oxygen had a purity of 99.99%, the nitrogen had a purity of 99.999%, and the argon had a purity of 99.999%.

Example 1

Water Vapor Solubility in Various LICs

The vapor-liquid equilibrium measurements were made using a gravimetric microbalance (IGA 003, Hiden Analytical). The microbalance includes a sample pan and counterweight symmetrically configured to minimize buoyancy effects. The balance has a 1 $\mu$g stable resolution. Approximately 75 mg of ionic liquid sample was added to the sample pan and the chamber was sealed. The sample was dried and degassed by first pulling a coarse vacuum on the sample with a diaphragm pump (MZ 2d, Vacuubrand) and then fully evacuating the chamber to ca. $10^{-9}$ bar with a turbomolecular pump (TMU 064, Pfeiffer). The sample was heated to about 75° C. during this process with an external furnace (SFL TF 1042, Fisher Scientific). After 4 and 8 h, sample mass slowly decreased as residual water and gases were driven off. Once the mass had stabilized for 30 min, the sample was considered pure, and the absorption measurements were initiated.

Figure 1:
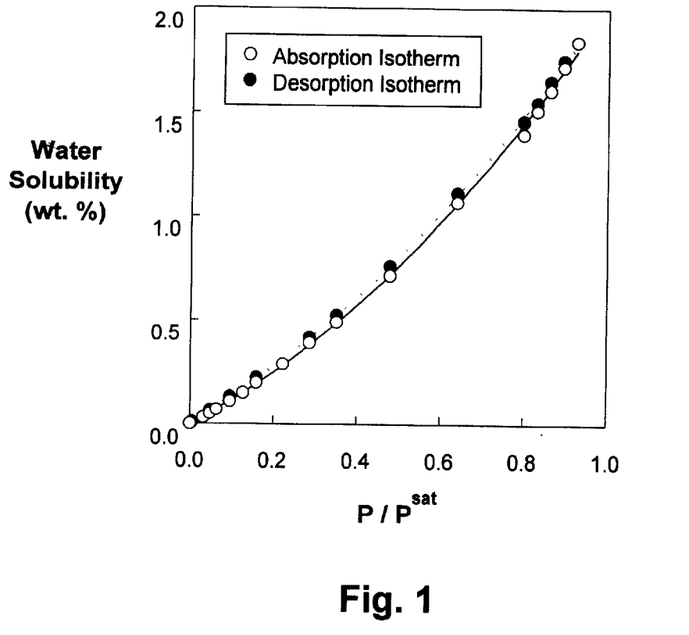
FIG. 1 shows the absorption/desorption isotherms for water vapor in 1-(n-butyl)-3-methylimidazolium hexafluorophosphate.

The furnace was removed and replaced by a water jacket connected to a constant temperature bath (RTE-111, Neslab). The sample temperature was monitored with a type K platinum thermocouple placed inside the sample chamber and automatically maintained to within 0.1° C. of the setpoint via the IGA software. Once the desired temperature of the sample was reached, water vapor was introduced into the sample chamber through a leak valve until a predetermined pressure was reached. Pressures from 0–100 mbar were measured using a capacitance manometer (Baratron 626, MKS), and above 100 mbar a strain gauge (PDCR 910, Druck) was used. The IGA software maintains the pressure to within 0.06% of the setpoint through control of the leak valve and exhaust valve. As the vapor entered the chamber, the sample mass increased as water absorbed into the sample. The weight change was monitored until the mass did not change significantly for 15 min. The sample was deemed to have reached equilibrium, yielding a single point on the absorption isotherm. This process was repeated through a predetermined set of pressures until the maximum pressure was reached (some fraction of the vapor pressure at the prevailing temperature). Once the highest pressure was reached, the process was reversed. The water pressure above the sample was gradually reduced in a series of small desorption steps, during which the decrease in sample mass was recorded. Upon completion of this process, a complete absorption/desorption isotherm was obtained, as shown in FIG. 1. The degree of hysteresis between the two isotherm branches gives an indication of the accuracy of each value. After the completion of an absorption/desorption loop, the sample was dried and degassed and the mass compared with the initial mass to confirm that the ionic liquid did not volatilize or decompose during the run. Even after performing multiple absorption/desorption experiments over several weeks, none of the samples exhibited a detectable loss in mass.

Figure 2:
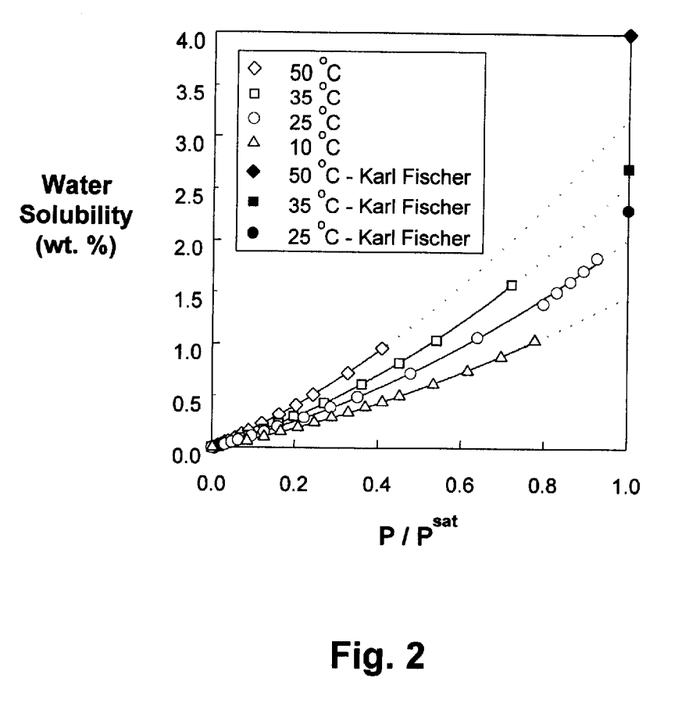
FIG. 2 shows the temperature-dependent solubility of water vapor in 1-(n-butyl)-3-methylimidazolium hexafluorophosphate.
Figure 3:
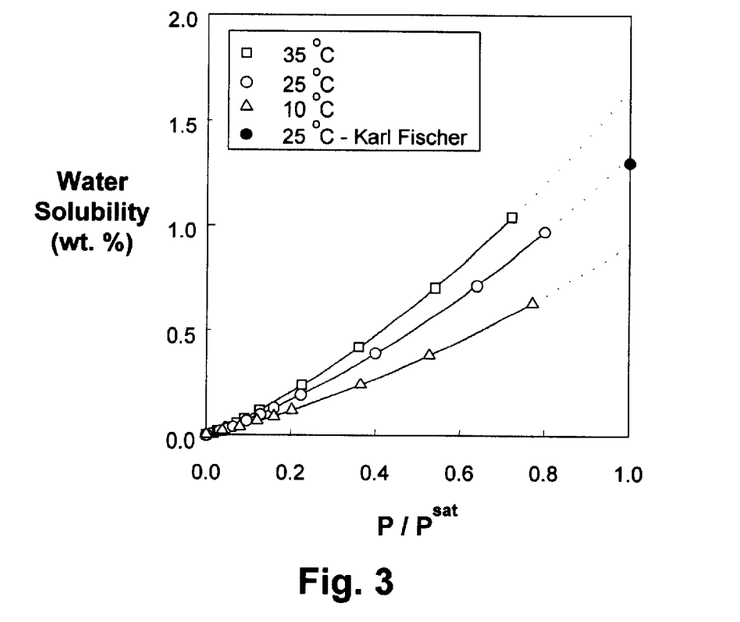
FIG. 3 shows the temperature-dependent solubility of water vapor in 1-n-octyl-3-methylimidazolium hexafluorophosphate.
Figure 4:
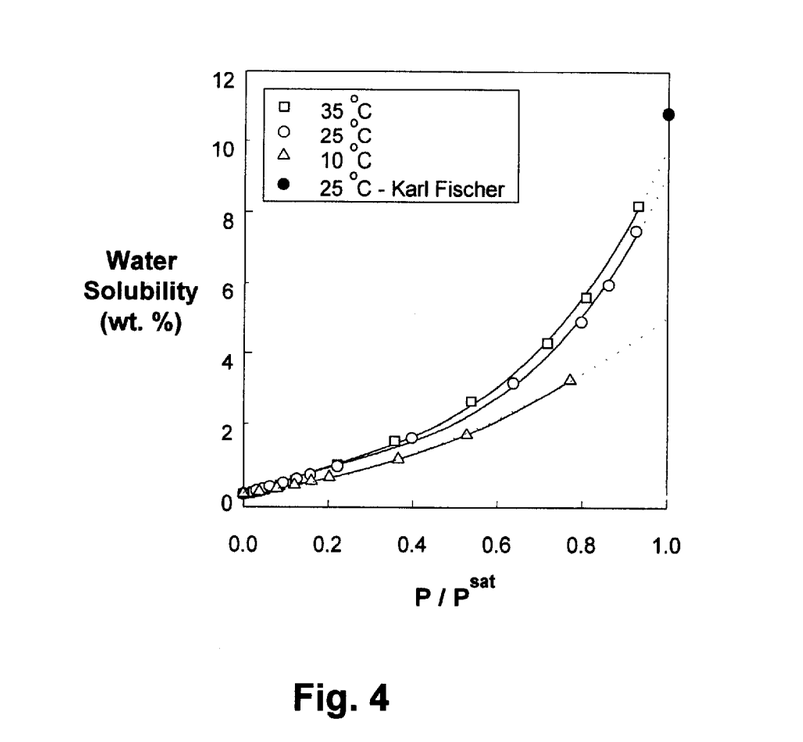
FIG. 4 shows the temperature-dependent solubility of water vapor in 1-n-octyl-3-methylimidazolium tetrafluoroborate.

The amount of water absorbed by the LIC, when exposed to various pressures of water vapor, was measured for all three ionic liquids at three different temperatures: 10° C., 25° C., and 35° C. The low pressure vapor-liquid equilibrium data for [bmim][$PF_6$] was also collected at 50° C. These results, plotted as the weight percent of water absorbed into the ionic liquids versus the ratio of the pressure of water to the vapor pressure of the water ($P^{sat}$), are shown in FIGS. 2–4. The corresponding values of $P^{sat}$ each temperature, which are all less than 0.123 bar, are listed in Table 1. The solid lines are meant to guide the eye and the dotted lines indicate the extrapolation of the data out to the vapor pressure of water ($P/P^{sat}=1$).

As shown in FIGS. 2–4, the solubility of water vapor is greatest in [$C_8$mim][$BF_4$]. A direct comparison of [$C_8$mim][$PF_6$] with [$C_8$mim][$BF_4$] (FIG 3–4) demonstrates the effect the anion may have in determining the amount of water vapor absorbed.

TABLE I

Henry's Law constants for water in various LICs as a function of temperature.

| T (° C.) | $p^{sat}$ (bar) | [$C_8$mim][$BF_4$] $H_1$ (bar) | [bmim][$PF_6$] $H_1$ (bar) | [$C_8$mim][$PF_6$] $H_1$ (bar) |
|---|---|---|---|---|
| 10 | 0.012 | 0.032 ± 0.006 | 0.08 ± 0.01 | 0.10 ± 0.01 |
| 25 | 0.032 | 0.060 ± 0.002 | 0.16 ± 0.02 | 0.20 ± 0.02 |
| 35 | 0.056 | 0.12 ± 0.03 | 0.24 ± 0.05 | 0.33 ± 0.04 |
| 50 | 0.123 | — | 0.47 ± 0.05 | — |

Example 2

Solubility of Various Gases in Various Liquid Ionic Compounds

The gas solubility measurements were made using a gravimetric microbalance (IGA 003, Hiden Analytical), as described above in Example 1 A small sample of LIC was added to the sample pan and the chamber was sealed. The sample was dried and degassed by evacuating the chamber to about $10^{-9}$ bar and heating to 75° C. Once the mass remained constant for at least 30 min, the sample was considered to be free of volatile contaminants. The temperature-controlled chamber was pressurized with the gas of interest using the static gas mode on the apparatus. The sample mass subsequently increased as gas absorbed into the sample. The weight change was monitored until the mass did not change significantly for at least 15 min. The sample was deemed to have reached equilibrium, yielding a single point on the absorption isotherm shown in FIG. 1. This process was repeated in steps up to a pressure of 13 bar. After 13 bar pressure was reached, the process was reversed. The gas pressure above the sample was gradually reduced in a series of small desorption steps, during which the decrease in sample mass was recorded. Upon completion of this process, a complete absorption/desorption isotherm was obtained (FIG. 1). The degree of hysteresis between the two isotherm branches gives an indication of the accuracy of each value. After the completion of an absorption/desorption loop, the sample was dried and degassed and the mass compared with the initial mass to confirm that the ionic liquid did not volatilize or decompose during the run. Even after performing multiple absorption/desorption experiments over many months, the sample exhibited no detectable loss in mass.

Figure 6:
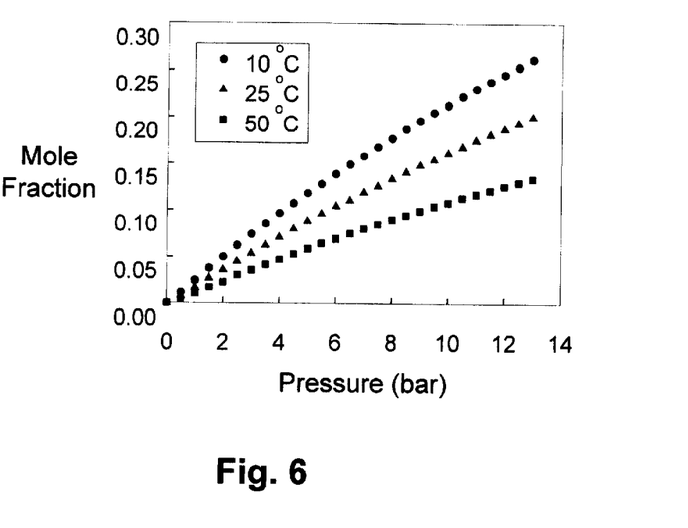
FIG. 6 shows the temperature-dependent solubility of $CO_2$ in 1-(n-butyl)-3-methylimidazolium hexafluorophosphate.
Figure 7:
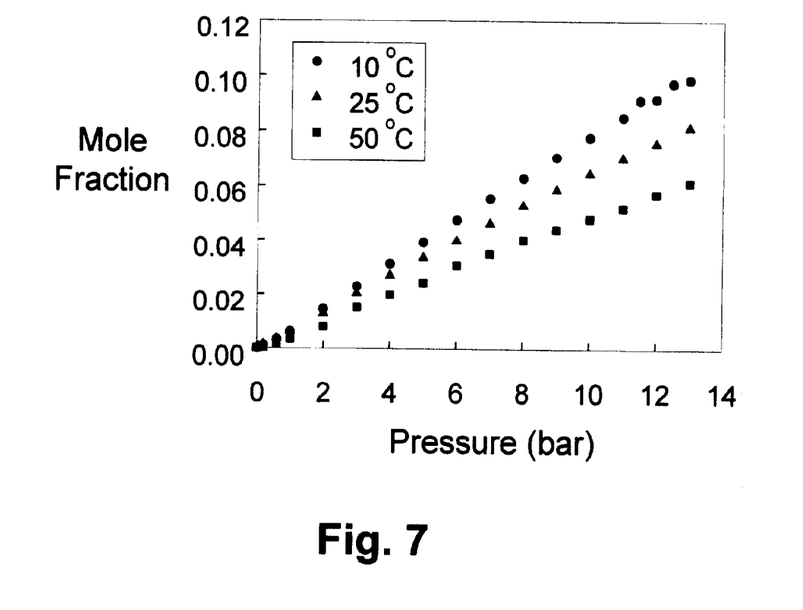
FIG. 7 shows the temperature-dependent solubility of $C_2H_4$ in 1-(n-butyl)-3-methylimidazolium hexafluorophosphate.
Figure 8:
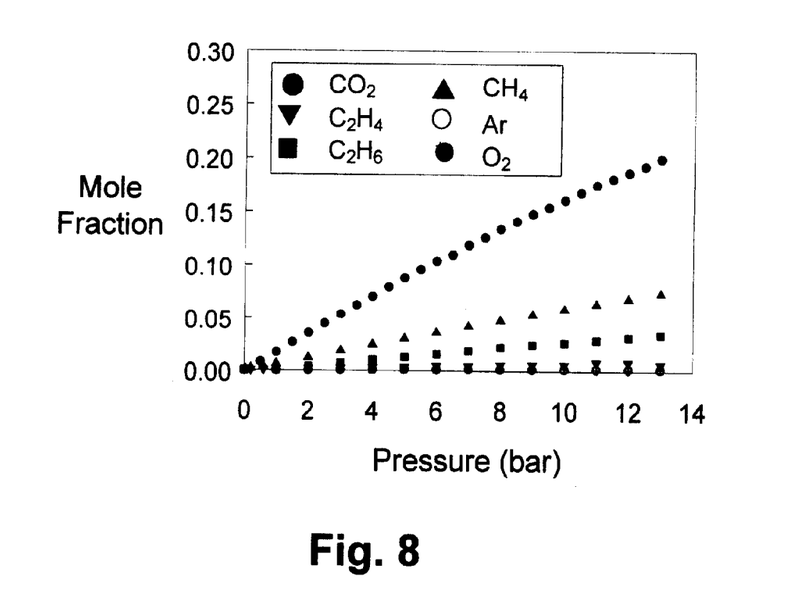
FIG. 8 shows temperature-dependent solubility of various gases in 1-(n-butyl)-3-methylimidazolium hexafluorophosphate.

The absorption of the different gases into different LICs was measured at various temperatures to a maximum gas pressure of 13 bar. The solubilities were obtained at 10° C., 25° C., 50° C., and 60° C. The $CO_2$ solubility in [bmim][$PF_6$] at the three temperatures is shown in FIG. 6. These three curves exhibit a nonlinear trend as the $CO_2$ pressure is increased. The curves begin to flatten out, indicating that the LIC is beginning to approach its maximum, pressure-independent capacity for $CO_2$. In contrast, as seen in FIG. 7, the $C_2H_4$ solubility in the LIC at the three temperatures is linear with pressure. Similar linear behavior was seen with $C_2H_6$, $CH_4$, $O_2$, and Ar as shown in FIG. 8. Carbon dioxide has the largest solubility, followed by ethylene, ethane, and then methane. Oxygen and argon both have very low solubilities. The low-molecular weight gases $H_2$, CO, and $N_2$ all had solubilities below the detection limit of the apparatus.

Example 3

Calculation of Henry's Law Constants for Various Gases in Various LICs

The solubility of a gas in a liquid is frequently described in terms of Henry's Law, which implies that, for gases that behave nearly ideally, the solubility is linearly related to the pressure. This relation holds for the experimental measurements of $C_2H_4$, $C_2H_6$, $CH_4$, $O_2$, and Ar. Therefore, those Henry's constants were found by calculating the linear slope of the data plot of solubility. However, as $CO_2$ was not linear for the entire pressure range, the Henry's Law constants were found by fitting a second order polynomial to the data and calculating the limiting slope as the pressure (or solubility) approaches zero.

As the microbalance measures the gas solubility on a mass basis, the detection limit depends on the molecular weight of the gas. The low-molecular weight gases $H_2$, CO, and $N_2$ all had solubilities below the detection limit of the apparatus. Using the lowest solubility measured ($O_2$ at 10° C.) as the minimum change in mass that can be measured with this apparatus, the Henry's Law constants can be approximated for gases with molecular weights of 2 g/mol ($H_2$) and 28 g/mol (CO and $N_2$) to be at least 1500 bar and 20,000 bar, respectively. The Henry's Law constants (K) for these gases are shown in Tables II–IV.

TABLE II

Henry's Law constants (K) of various gases in 1-n-butyl-3-methylimidazolium hexafluorophosphate as a function of temperature.

| | 10° C. | 25° C. | 50° C. |
|---|---|---|---|
| $H_2O$ | 0.09 ± 0.02 | 0.17 ± 0.02 | 0.45 ± 0.05 |
| $CO_2$ | 38.7 ± 0.4 | 53.4 ± 0.3 | 81.3 ± 0.5 |
| $C_2H_4$ | 142 ± 14 | 173 ± 17 | 221 ± 22 |
| $C_2H_6$ | 284 ± 47 | 355 ± 36 | 404 ± 41 |
| $CH_4$ | 1480 ± 110 | 1690 ± 180 | 1310 ± 290 |
| $O_2$ | 23000 ± 15000 | 8000 ± 5400 | 1550 ± 170 |
| Ar | 22000 ± 10000 | 8000 ± 3800 | 1340 ± 220 |
| CO | ND | ND | ND |
| $N_2$ | ND | ND | ND |
| $H_2$ | ND | ND | ND |

ND: >20,000 for CO and $N_2$; >1,500 for $H_2$.

TABLE III

Henry's Law constants (K) of $CO_2$ in 1-n-butyl-2,3-dimethyl-imidazolium hexafluorophosphate as a function of temperature.

| | 10° C. | 25° C. | 50° C. |
|---|---|---|---|
| $CO_2$ | 49.2 ± 8.1 | 65.4 ± 2.4 | 96.7 ± 10.4 |

TABLE IV

Henry's Law constants (K) of $CO_2$ in 1-n-butyl-2,3-dimethyl-imidazolium tetrafluoroborate as a function of temperature.

| | 10° C. | 25° C. | 50° C. |
|---|---|---|---|
| $CO_2$ | 49.2 ± 4.1 | 67.8 ± 6.2 | 108.9 ± 10.4 |

Example 4

Separation of Nitrogen and Carbon Dioxide in a Batch Process

Figure 5:
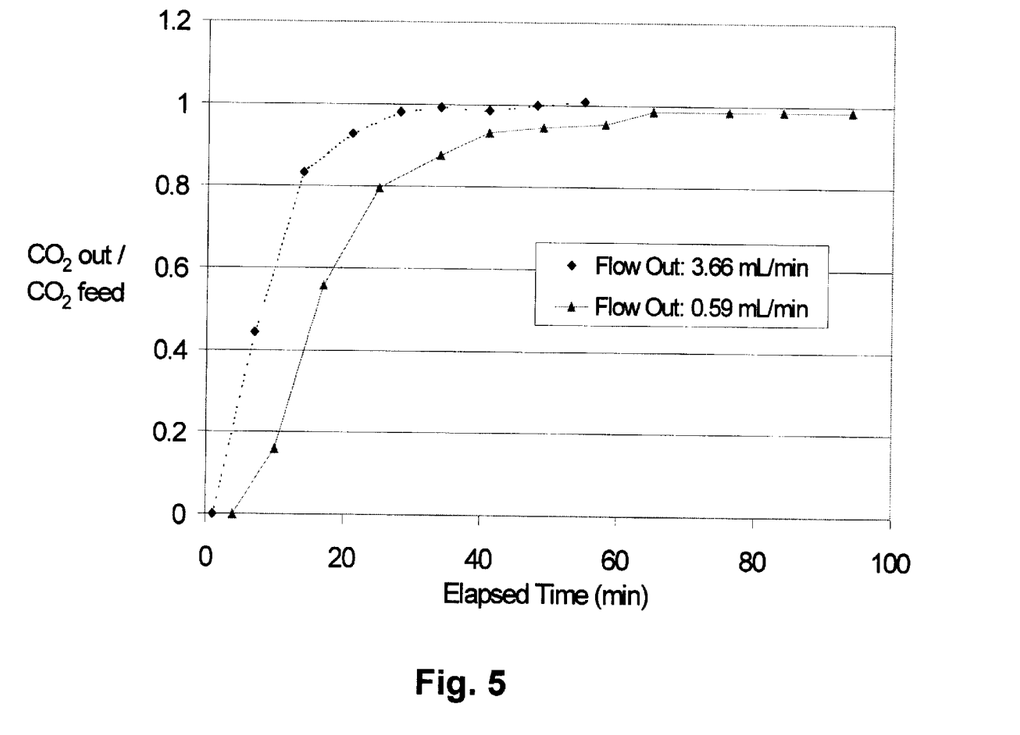
FIG. 5 shows breakthrough curves for $CO_2/N_2$ separation with 1-(n-butyl)-3-methylimidazolium hexafluorophosphate at 0.59 mL/min and 3.66 mL/min.
Figure 9:
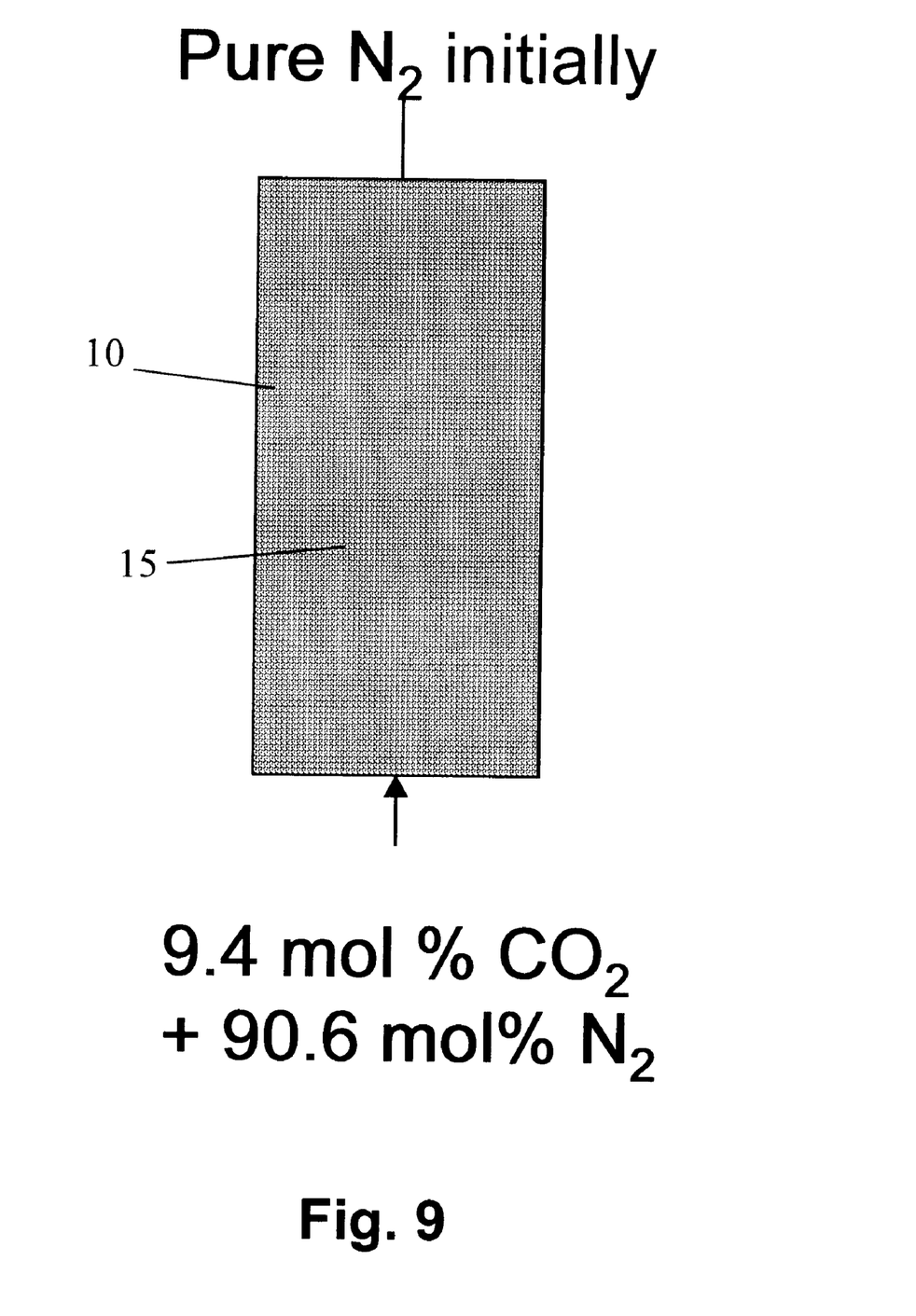
FIG. 9 shows a batch absorber configuration.

A mixture of gases consisting of 9.4% $CO_2$ and 90.6% $N_2$ was fed into 1 inch diameter column 10 containing glass beads 15 coated with 1-(n-butyl)-3-methylimidazolium hexafluorophosphate to a depth of about 3 inches, as shown in FIG. 9. The gas flow rate was 0.59 mL/min or 3.66 mL/min. Breakthrough curves for $CO_2$ saturation of the LIC coating on the glass beads are shown in FIG. 5 for the two flow rates. While glass beads are used for the support, it is understood that other solid particulate substrates may be used.

Example 5

Figure 10:
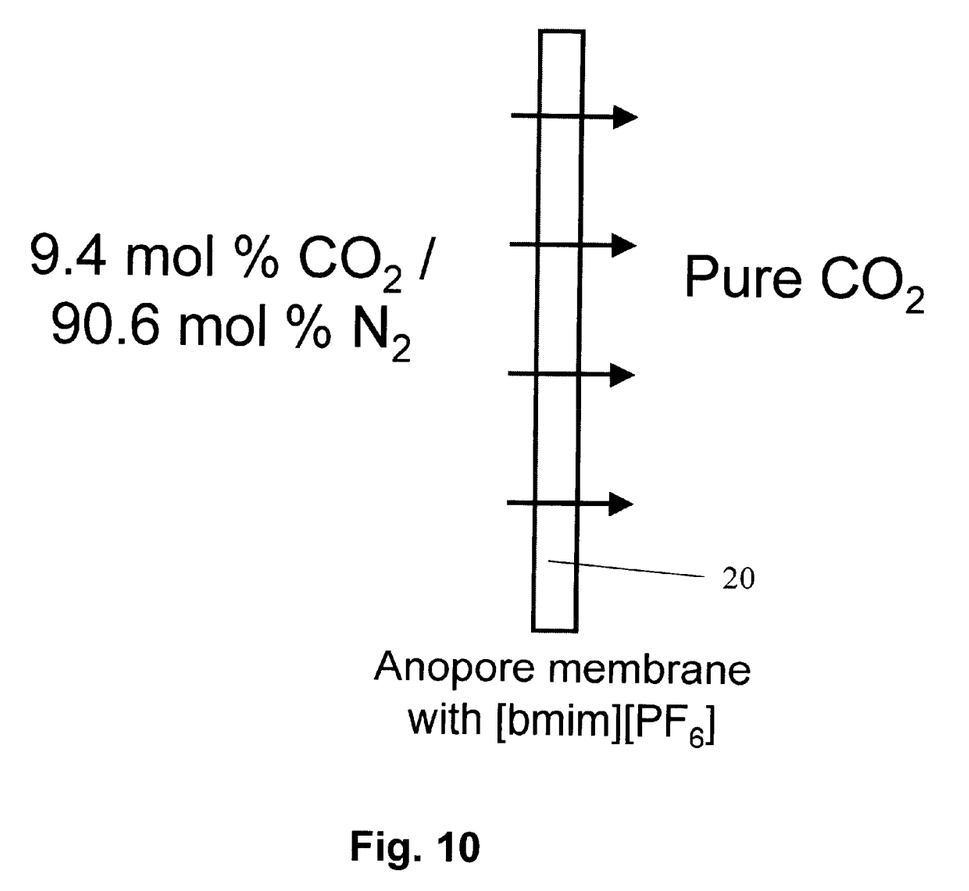
FIG. 10 shows a supported liquid membrane configuration.

Separation of Nitrogen and Carbon Dioxide in a Supported Liquid Membrane Configuration A mixture of 9.4% $CO_2$ and 90.6% $N_2$ was contacted with a supported liquid membrane 20 constructed from a thin anopore (alumina) membrane coated with 1-(n-butyl)-3-methylimidazolium hexafluorophosphate, as shown in FIG. 10. The pressure differential across the membrane was 8 psig. After 17 hours of contact of the gas mixture with the membrane, the permeate gas was collected and analyzed as essentially pure $CO_2$.

Example 6

Additional Measurements

The stability of additional gases in tri-isobutyl(methyl)phosphonium tosylate has been measured, as follows:

| | |
|---|---|
| $CO_2$ at 50° C. | 103.5 + 5.2 bar |
| $O_2$ at 60° C. | 1122.5 + 313.0 bar |

Although the invention has been described in detail with reference to certain preferred embodiments, variations and modifications exist within the scope and spirit of the invention as described and defined in the following claims.

What is claimed is:

1. A method for separating a gas from a gaseous mixture, comprising the step of contacting the gaseous mixture with a liquid ionic compound, said liquid ionic compound comprising a nitrogen-containing heterocyclic cation.

2. The method of claim 1 wherein the liquid ionic compound comprises a compound selected from the group consisting of:

(a) a compound of the formula where:
$R^1$ is hydrogen or $C_1$–$C_{18}$ alkyl;
A is —O—, —S—, or —N($R^4$)—;
B is —N—or —C($R^5$)—;
$R^2$, $R^3$, $R^4$, and $R^5$ are independently hydrogen, $C_1$–$C_6$ alkyl, $C_2$–$C_6$ alkenyl, $C_3$–$C_6$ cycloalkyl, $C_3$–$C_8$ cycloalkenyl, aryl, substituted aryl, aryl($C_1$–$C_4$ alkyl), or substituted aryl($C_1$–$C_4$ alkyl); and
X is an anion selected from the group consisting of hydroxide, chloride, bromide, iodide, borate, tetrafluoroborate, cuprate, Cu(I)Cl$_2$ anion, phosphate, hexafluorophosphate, hexafluoroantimonate, perchlorate, nitrite, nitrate, sulfate, a carboxylate, a sulfonate, a sulfonimide, and a phosphonate; and, n is an integer from 1 to 4; and
(b) a compound of the formula where:
R$^1$ is as defined above;
A is as defined above;
B is as defined above;
R$^2$ is as defined above;
R$^6$ is hydrogen, C$_1$–C$_6$ alkyl, C$_2$–C$_6$ alkenyl, C$_3$–C$_6$ cycloalkyl, C$_3$–C$_8$ cycloalkenyl, aryl, substituted aryl, aryl(C$_1$–C$_4$ alkyl), or substituted aryl(C$_1$–C$_4$ alkyl);
X is as defined above; and,
n is as defined above; and
(c) a compound of the formula where:
R$^1$ is as defined above;
U, V, and W are independently —N— or —C(R$^9$)—, provided that U and V are not simultaneously —N—;
R$^7$, R$^8$, and R$^9$ are independently hydrogen, C$_1$–C$_6$ alkyl, C$_2$–C$_6$ alkenyl, C$_3$–C$_6$ cycloalkyl, C$_3$–C$_8$ cycloalkenyl, aryl, substituted aryl, aryl(C$_1$–C$_4$ alkyl), or substituted aryl(C$_1$–C$_4$ alkyl);
X is as defined above; and,
n is as defined above.

3. The method of claim 1 wherein the liquid ionic compound is a compound selected from the group consisting of imidazolium salts, pyrazolium salts, oxazolium salts, thiazolium salts, triazolium salts, pyridinium salts, pyridazinium salts, pyrimidinium salts, and pyrazinium salts.

4. The method of claim 1 wherein the liquid ionic compound is selected from the group consisting of 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium tetrafluoroborate, 1-butyl-3-methylimidazolium iodide, 1-butyl-3-methylimidazolium nitrate, 1-ethyl-3-methylimidazolium tetrafluoroborate, 1-ethyl-3-methylimidazolium bromide, 1-ethyl-3-methylimidazolium iodide, 1-ethyl-3-methylimidazolium nitrate, 1-butylpyridinium tetrafluoroborate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium triflate, 1-butyl-3-methylimidazolium acetate, 1-butyl-3-methylimidazolium trifluoroacetate, and 1-butyl-3-methylimidazolium bis(trifluoromethanesulfonimide).

5. The method of claim 1 wherein the liquid ionic compound is selected from the group consisting of 1-butyl-3-methylimidazolium hexafluorophosphate, 1-octyl-3-methylimidazolium hexafluorophosphate, 1-butyl-3-methylimidazolium nitrate, 1-octyl-3-methylimidazolium tetrafluoroborate, 1-ethyl-3-methylimidazolium ethylsulfate, N-butylpyridinium tetrafluoroborate, 1-butyl-3-methylimidazolium triflate, 1-butyl-3-methylimidazolium acetate, 1-butyl-3-methylimidazolium trifluoroacetate, and 1-butyl-3-methylimidazolium bis(trifluoromethanesulfonimide).

6. The method of claim 1 wherein the liquid ionic compound is provided as a supported liquid membrane.

7. The method of claim 6 wherein the gaseous mixture comprises carbon dioxide and nitrogen, the gas is nitrogen, and wherein carbon dioxide selectively diffuses through the supported liquid membrane.

8. The method of claim 7 wherein the carbon dioxide that diffuses through the supported liquid membrane is substantially free of nitrogen.

9. The method of claim 6 wherein the supported liquid membrane comprises a first side and a second side, the contacting step comprises contacting the first side of the membrane with the gaseous mixture, and wherein impurities diffuse to the second side of the membrane.

10. The method of claim 6, wherein the supported liquid membrane comprises a first side and a second side, the contacting step comprises contacting the first side with the gaseous mixture such that the gas diffuses to the second side of the membrane, and further comprising the step of collecting the gas that diffuses to the second side of the membrane.

11. The method of claim 6 wherein the gas and an impurity in the gaseous mixture have a ratio of Henry's law constants for the liquid ionic compound of at least 20.

12. The method of claim 11 further comprising the step of adjusting the temperature of the liquid ionic compound to increase the ratio and improve separation efficiency.

13. The method of claim 6 wherein the gaseous mixture comprises an alkane and an olefin, and the alkane and olefin have a ratio of Henry's law constants for the liquid ionic compound of at least 2.0.

14. The method of claim 6 wherein the gaseous mixture comprises an alkane and an olefin, and the alkane and olefin have a ratio of Henry's law constants for the ionic compound of at least 1.7.

15. The method of claim 1 wherein the liquid ionic compound is substantially free of water.

16. The method of claim 1 wherein the gaseous mixture is selected from the group consisting of natural gas and air.

17. The method of claim 1 wherein the gaseous mixture includes carbon dioxide as an impurity and carbon dioxide is removed from the gaseous mixture.

18. The method of claim 1 wherein the gaseous mixture includes water and water is removed from the gaseous mixture.

19. The method of claim 1 wherein the gaseous mixture includes both water and carbon dioxide and the method comprises decreasing the amount of carbon dioxide and water in the gaseous mixture.

20. The method of claim 1 wherein the liquid ionic compound is provided in a fixed bed and the contacting step comprises flowing the gaseous mixture into the fixed bed.

21. The method of claim 20 wherein the liquid ionic compound is coated on the surface of a solid particulate substrate within the fixed bed.

22. The method of claim 20 wherein the gaseous mixture is flowed continuously through the fixed bed.

23. The method of claim 20 wherein the gaseous mixture is held in contact with the fixed bed for a prescribed residence time.

24. The method of claim 20 wherein the gas is retained within the fixed bed and impurities are allowed to flow out of the fixed bed.

25. The method of claim 20 wherein impurities are retained within the fixed bed and the gas is collected as the gas flows out of the fixed bed.

26. The method of claim 20 wherein the gas and an impurity within the gaseous mixture have a ratio of Henry's law constants for the liquid ionic compound of at least 17.

27. The method of claim 26 further comprising the step of adjusting the temperature of the liquid ionic compound to increase the effective ratio.

28. The method of claim 1 further comprising the step of contacting the gaseous mixture with a second liquid ionic compound, said second liquid ionic compound comprising a nitrogen-containing heterocyclic cation.

29. The method of claim 28 wherein the first and second liquid ionic compounds are intermixed, and the steps of contacting the gaseous mixture with the liquid ionic compound and contacting the gaseous mixture with the second liquid ionic compound are performed at the same time.

30. The method of claim 1 wherein the gas is purified to be essentially free of one or more impurities present in the gaseous mixture.

* * * * *